United States Patent
Wein

(10) Patent No.: US 8,565,973 B2
(45) Date of Patent: Oct. 22, 2013

(54) METHOD FOR OPERATING A MOTOR VEHICLE, AND MOTOR VEHICLE

(75) Inventor: Michael Wein, Seubersdorf (DE)

(73) Assignee: Audi AG, Ingolstadt (DE)

( * ) Notice: Subject to any disclaimer, the term of this patent is extended or adjusted under 35 U.S.C. 154(b) by 0 days.

(21) Appl. No.: 13/805,283

(22) PCT Filed: Jun. 1, 2011

(86) PCT No.: PCT/EP2011/002698
§ 371 (c)(1),
(2), (4) Date: Jan. 10, 2013

(87) PCT Pub. No.: WO2011/157357
PCT Pub. Date: Dec. 22, 2011

(65) Prior Publication Data
US 2013/0204492 A1    Aug. 8, 2013

(30) Foreign Application Priority Data
Jun. 19, 2010   (DE) .......................... 10 2010 024 387

(51) Int. Cl.
*B60G 17/015*    (2006.01)
*B62D 17/00*    (2006.01)

(52) U.S. Cl.
USPC ................................ 701/37; 701/69; 280/5.5

(58) Field of Classification Search
USPC ............. 701/36, 37, 38, 39, 701, 91; 280/5.5; 180/415
See application file for complete search history.

(56) References Cited

U.S. PATENT DOCUMENTS

| | | | |
|---|---|---|---|
| 4,828,283 A * | 5/1989 | Ishii et al. ...................... | 180/415 |
| 5,557,525 A | 9/1996 | Miichi et al. | |
| 7,533,754 B2 | 5/2009 | Burrows et al. | |
| 2003/0111812 A1 | 6/2003 | Carlstedt | |
| 2005/0098964 A1* | 5/2005 | Brown ........................... | 280/5.5 |
| 2008/0183353 A1 | 7/2008 | Post et al. | |
| 2010/0023214 A1 | 1/2010 | Horiguchi et al. | |
| 2010/0105520 A1 | 4/2010 | Ohbayashi et al. | |

FOREIGN PATENT DOCUMENTS

| | | |
|---|---|---|
| DE | 20 53 649 A | 5/1972 |
| EP | 1 826 089 A2 | 8/2007 |
| JP | 4 126622 A | 4/1992 |
| WO | WO2011/144279 A1 | 11/2011 |

OTHER PUBLICATIONS

International Search Report issued by the EPO on Aug. 11, 2011.

* cited by examiner

*Primary Examiner* — Tan Q Nguyen
(74) *Attorney, Agent, or Firm* — Henry M Feiereisen LLC

(57) ABSTRACT

A method for operating a motor vehicle which can be driven in at least two drive modes which differ from one another as to whether or not at least one wheel of the motor vehicle is driven is designed to increase the safety in the driving behavior when the drive mode changes, by adjusting a previously defined value which is assigned to the current drive mode for a variable that is related to a chassis device of the motor vehicle.

8 Claims, 1 Drawing Sheet

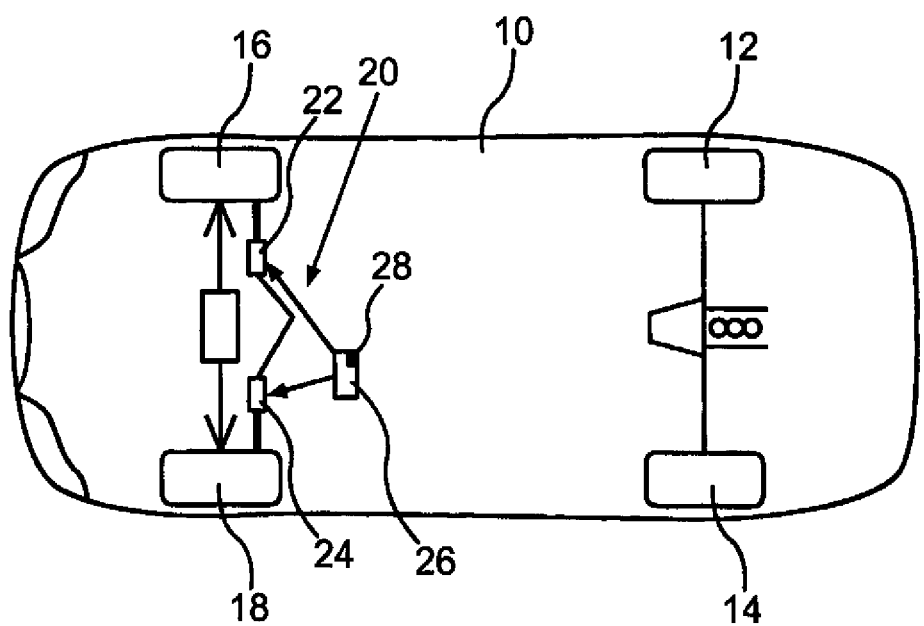

METHOD FOR OPERATING A MOTOR VEHICLE, AND MOTOR VEHICLE

CROSS-REFERENCES TO RELATED APPLICATIONS

This application is the U.S. National Stage of International Application No. PCT/EP2011/002698, filed Jun. 1, 2011, which designated the United States and has been published as International Publication No. WO 2011/157357 and which claims the priority of German Patent Application, Serial No. 10 2010 024 387.6, filed Jun. 19, 2010, pursuant to 35 U.S.C. 119(a)-(d).

BACKGROUND OF THE INVENTION

The invention relates to a method for operating a motor vehicle, wherein the motor vehicle can be driven in at least two drive modes which are distinguished from one another by whether or not at least one wheel is driven. The invention also relates to a motor vehicle.

For example, the drive modes "front wheel drive", "rear wheel drive" or "all-wheel drive" are known.

A vehicle operator may change the drive mode with, for example, a driver input. Likewise, a change of the drive mode may be caused by a control unit, which is frequently the case with hybrid vehicles, which also have an electric drive in addition to an internal combustion engine, wherein the electric drive is switched on or off as appropriate.

Different settings of a suspension may be required depending on the specific drive mode in order to ensure an optimal, safe driving behavior.

When the drive mode is changed, the settings of the suspension are often no longer favorable for the new drive mode. The driving safety of the motor vehicle is then diminished.

SUMMARY OF THE INVENTION

It is therefore an object of the present invention to provide a method for operating a motor vehicle, by which the safety in the driving behavior of the motor vehicle is improved.

This object is attained with the present invention by a method for operating a motor vehicle which can be driven in at least two drive modes, which differ from one another as to whether or not at least one wheel of the motor vehicle is driven, wherein a previously determined value associated with the current drive mode of a variable related to a suspension device of the motor vehicle is automatically adjusted when the drive mode is changed, and by a motor vehicle which can be driven in at least two drive modes, wherein the drive modes differ from each other with respect to at least one wheel of the motor vehicle as to whether or not the at least one wheel is driven. The motor vehicle includes a suspension device which allows during operation of the motor vehicle at least one automatic change with respect to at least one adjustment, and further a control unit which is configured to automatically set, when the drive mode changes, a previously determined value associated with the current drive mode of a variable related to the suspension device of the vehicle.

According to the invention, when the drive mode is changed, a pre-determined value related to the applied drive mode of a variable associated with a suspension device of the vehicle size is automatically set. The performance of the motor vehicle can then always be matched to the current drive mode, thus increasing the safety in the driving characteristic.

The suspension devices can be produced easily and cost-effectively, because the adjustments can be made relatively slowly. Performing dynamic settings does not require the use of an expensive, active suspension, which is generally used, for example, in modern vehicles.

Conversely, the number of possible adjustments, which can be performed on the suspension device, may be reduced to the currently necessary number. For example, a suspension device may conceivably be used which permits only two different adjustment positions of variables which are important for the driving characteristic, for example, one respective adjustment position of the variables for the drive mode "front wheel drive" and another respective adjustment position for the drive mode "rear wheel drive". It would of course also be possible to use inexpensive chassis devices which allow additional settings.

Before a trip, a value for at least one variable related to a suspension device of the motor vehicle can be associated with at least one drive mode. The corresponding dataset is then stored in the motor vehicle. In this way, the optimum value of the variable related to the suspension device of the vehicle can be easily adjusted for a specific drive mode.

The variable relating to the suspension device of the vehicle size may include, for example, a toe angle, a camber angle or a castor angle of a wheel of the motor vehicle, i.e. generally variables of the chassis that can be influenced by changing the kinematics or elastokinematics. These wheel position parameters are particularly important for safe driving properties and allow the vehicle to be optimally adapted to the particular drive mode.

When the current drive mode is determined by a torque operating on a wheel axle, it can be easily detected when the current drive mode is changed. It may of course also be conceivable that the current drive mode is determined by a monitoring device which is anyway installed in the motor vehicle.

A motor vehicle according to the present invention can be driven in at least two drive modes, which differ from one another with respect to at least one wheel of the motor vehicle as to whether or not the at least one wheel is driven. The motor vehicle according to the present invention further includes a chassis device which allows at least an automatic change of the at least one setting during operation of the vehicle. A control unit is configured to automatically set, when the drive mode is changed, a predetermined value of a variable related to a suspension device of the vehicle assigned to the current drive. The motor vehicle can then still be driven safely even when the drive mode changes.

The variable relating to the suspension device of the vehicle size may be a toe angle, a camber angle or a castor angle of a wheel of the motor vehicle, in general those variables of the chassis suspension which can be affected by a change of kinematics or elastokinematics. The motor vehicle can be driven particularly safely by adapting these wheel adjusting variables to the respective current drive mode.

In another embodiment, the control unit includes a memory for storing data representing an association of at least one additional drive mode with a specific value for the variable related to the suspension device relating of the motor vehicle. The control unit is configured, upon detection of this drive mode, to control the suspension device so that the value associated with the drive mode for the variable related to the suspension device of the vehicle size is adjusted. In this way, the respective optimum values of the variable for the respective current drive mode can be particularly easily set.

For example, the data are stored in the memory in the form of a characteristic curve, a characteristic curve field and the like.

BRIEF DESCRIPTION OF THE DRAWING

A preferred embodiment of the invention will now be described with reference to the drawing, wherein the sole FIG. 1 shows in a schematic diagram a motor vehicle that can be driven in at least two drive modes.

DETAILED DESCRIPTION OF PREFERRED EMBODIMENTS

A motor vehicle 10 is operated during travel in "rear wheel drive", wherein rear wheels 12, 14 are actively driven. The front wheels 16, 18 of the motor vehicle 10 are not actively driven in this drive mode.

In addition, the motor vehicle 10 includes a suspension device 20, with which actuators 22, 24 are able to adjust the toe angle of the front wheels 16, 18. When driving in the drive mode "rear wheel drive", the toe angle of the front wheels 16, 18 is now optimally set for this drive mode. When the driver or a controller now changes the drive mode, the control unit 26 of the suspension device 20 controls the actuators 22, 24 such that the toe angle of the front wheels 16, 18 is changed. For this purpose, a memory 28 is provided in the control unit 26, in which different values for the toe angle of the front wheels 16, 18 defined before the travel are stored for the different drive modes, for example, in the form of a characteristic curve and a characteristic curve field.

It would of course also be conceivable that a camber angle or a castor angle of the front wheels 16, 18 or of the rear wheels 12, 14 are changed in a similar manner by additional actuators. When the vehicle can also be driven in the all-wheel drive mode, specific values of the variables may be assigned also to this drive mode, which are then adjusted by actuators of the suspension device 20 when the motor vehicle 10 is operated in this all-wheel mode.

What is claimed is:

1. A method of operating a motor vehicle (10) which can be driven in at least two drive modes selectable from front-wheel drive mode, rear-wheel drive mode and all-wheel drive mode, comprising:
   when a drive mode is changed from a current drive mode, automatically adjusting a previously determined value of a variable related to a suspension device of the motor vehicle, wherein the previously determined value is associated with the current drive mode.

2. The method of claim 1, further comprising:
   before travel, associating with at least one of the drive modes a value for at least one variable related to a suspension device of the motor vehicle, and
   storing a corresponding data set in the motor vehicle.

3. The method of claim 1, wherein the variable related to the suspension device of the motor vehicle is a toe angle, a camber angle or a castor angle of a wheel of the motor vehicle or another kinematically or elastokinematically changeable suspension variable.

4. The method of claim 1, wherein the current drive mode is determined from a torque operating on a wheel axle.

5. A motor vehicle which is configured to be driven in at least two drive modes selectable from front-wheel drive mode, rear-wheel drive mode and all-wheel drive mode, the motor vehicle comprising:
   a suspension device which allows at least one automatic adjustment with respect to at least one setting during operation of the motor vehicle,
   a control unit which is configured to automatically adjust, when a drive mode is changed from a current drive mode, a previously determined value associated with the current drive mode of a variable related to the suspension device of the motor vehicle.

6. The motor vehicle of claim 5, wherein the variable related to the suspension device of the motor vehicle is a toe angle, a camber angle or a castor angle of a wheel of the motor vehicle or an additional kinematically or elastokinematically changeable suspension variable.

7. The motor vehicle of claim 5, wherein the control unit comprises a memory for storing data representing an association of at least one specific drive mode with a specific value for the variable related to the suspension device of the motor vehicle, and wherein the control unit is configured to control the suspension device, upon detection of the at least one specific drive mode, so as to adjust the value associated with the drive mode of the variable related to the suspension device of the motor vehicle.

8. The motor vehicle of claim 7, wherein the data are stored in the memory in the form of a characteristic curve or a characteristic curve field.

* * * * *